US009347801B2

(12) United States Patent
Ozaki et al.

(10) Patent No.: US 9,347,801 B2
(45) Date of Patent: May 24, 2016

(54) MOTOR DRIVING SYSTEM FOR ELECTRIC VEHICLE

(75) Inventors: Takayoshi Ozaki, Iwata (JP); Shintarou Ueno, Iwata (JP); Toru Takahashi, Iwata (JP)

(73) Assignee: NTN CORPORATION, Osaka (JP)

( * ) Notice: Subject to any disclaimer, the term of this patent is extended or adjusted under 35 U.S.C. 154(b) by 614 days.

(21) Appl. No.: 13/583,094

(22) PCT Filed: Mar. 4, 2011

(86) PCT No.: PCT/JP2011/055045
§ 371 (c)(1),
(2), (4) Date: Sep. 6, 2012

(87) PCT Pub. No.: WO2011/111617
PCT Pub. Date: Sep. 15, 2011

(65) Prior Publication Data
US 2012/0330490 A1    Dec. 27, 2012

(30) Foreign Application Priority Data

Mar. 10, 2010 (JP) ................................. 2010-053306

(51) Int. Cl.
*B60L 15/20*    (2006.01)
*G01D 5/245*    (2006.01)
(Continued)

(52) U.S. Cl.
CPC ............ *G01D 5/2451* (2013.01); *H02K 11/215* (2016.01); *H02P 29/024* (2013.01); *H02P 29/028* (2013.01); *F16H 2001/325* (2013.01);
(Continued)

(58) Field of Classification Search
CPC ................................. B62D 53/00; G08G 1/168
USPC ............................................................ 701/22
See application file for complete search history.

(56) References Cited

U.S. PATENT DOCUMENTS 7,157,907 B2    1/2007 Sato
7,433,767 B2    10/2008 Takeuchi et al.
(Continued)

FOREIGN PATENT DOCUMENTS

CN        1374737        10/2002
CN        1769843        5/2006
(Continued)

OTHER PUBLICATIONS

International Search Report of PCT/JP2011/055045 mailed Apr. 12, 2011.
(Continued)

*Primary Examiner* — Helal A Algahaim
*Assistant Examiner* — Charles J Han (57) ABSTRACT

To provide a motor driving system for an electrically powered automotive vehicle, in which the drive motor is rotationally controlled to increase the reliability, the use is made of an angle sensor for detecting the relative rotational angle between a stator and a rotor of a drive motor for driving the electric vehicle and a controller for controlling the rotation of the drive motor on the basis of the relative rotational angle detected by the angle sensor. The angle sensor is provided in a plural number. The controller includes an angle sensor switching unit operable to select and activate one of the plurality of the angle sensors and then to switch over to an activation of another one of the angle sensors in the event that the one of the angle sensors is determined abnormal.

9 Claims, 4 Drawing Sheets (51) Int. Cl.
*H02P 29/02* (2016.01)
*H02K 7/116* (2006.01)
*F16H 1/32* (2006.01)

(52) U.S. Cl.
CPC .............. *H02K 7/116* (2013.01); *Y02T 10/641* (2013.01); *Y02T 10/7258* (2013.01)

(56) References Cited

U.S. PATENT DOCUMENTS

| | | |
|---|---|---|
| 7,583,080 B2 | 9/2009 | Uehira et al. |
| 7,923,993 B2 | 4/2011 | Takahashi et al. |
| 8,564,232 B2 | 10/2013 | Sato |
| 2005/0159866 A1 | 7/2005 | Takeuchi et al. |
| 2005/0248306 A1* | 11/2005 | Chen et al. .................. 318/712 |
| 2006/0158180 A1 | 7/2006 | Sato |
| 2006/0220607 A1 | 10/2006 | Imagawa et al. |
| 2009/0021246 A1 | 1/2009 | Uehira et al. |
| 2009/0315544 A1 | 12/2009 | Takahashi et al. |
| 2011/0043146 A1 | 2/2011 | Sato |

FOREIGN PATENT DOCUMENTS

| | | |
|---|---|---|
| CN | 101115968 | 1/2008 |
| CN | 101490926 | 7/2009 |
| EP | 1512609 A1 | 3/2005 |
| EP | 2242173 A1 | 10/2010 |
| JP | 2002-122495 | 4/2002 |
| JP | 2004-233281 | 8/2004 |
| JP | 2004233281 A * | 8/2004 |
| JP | 2006-250864 | 9/2006 |
| JP | 2007-209105 | 8/2007 |
| JP | 2007209105 A * | 8/2007 |
| JP | 2008-168790 | 7/2008 |
| JP | 2008-233069 | 10/2008 |
| JP | 2008-309618 | 12/2008 |
| JP | 2009-74583 | 4/2009 |
| JP | 2009074583 A * | 4/2009 |
| JP | 4404160 | 11/2009 |
| WO | WO 2008/007120 A2 | 1/2008 |

OTHER PUBLICATIONS

English Translation of the International Preliminary Report on Patentability issued Oct. 11, 2012 in corresponding International Patent Application No. PCT/JP2011/055045.
Japanese Office Action mailed Oct. 22, 2013, in corresponding Japanese Application No. 2010-053306.
Chinese Office Action dated Nov. 4, 2014 in corresponding Chinese Patent Application No. 201180012792.9.
Extended European Search Report mailed Feb. 15, 2016 in related European Application No. 11753276.2.
Decision of Grant issued Feb. 4, 2014 in corresponding Japanese Patent Application No. 2010-053306.

* cited by examiner

MOTOR DRIVING SYSTEM FOR ELECTRIC VEHICLE

CROSS REFERENCE TO THE RELATED APPLICATION

This application claims the benefit under 35 U.S.C. Section 371, of international application no. PCT/JP2011/055045 filed Mar. 4, 2011 and claims foreign priority to Japanese patent application No. 2010-053306, filed Mar. 10, 2010, the entire disclosures of which are herein incorporated by reference as a part of this application.

BACKGROUND OF THE INVENTION

1. Field of the Invention

The present invention relates to a motor driving system for an electrically powered automotive vehicle of a kind utilizing a drive motor as a drive source for driving the automotive vehicle.

2. Description of Related Art

Figure 5:
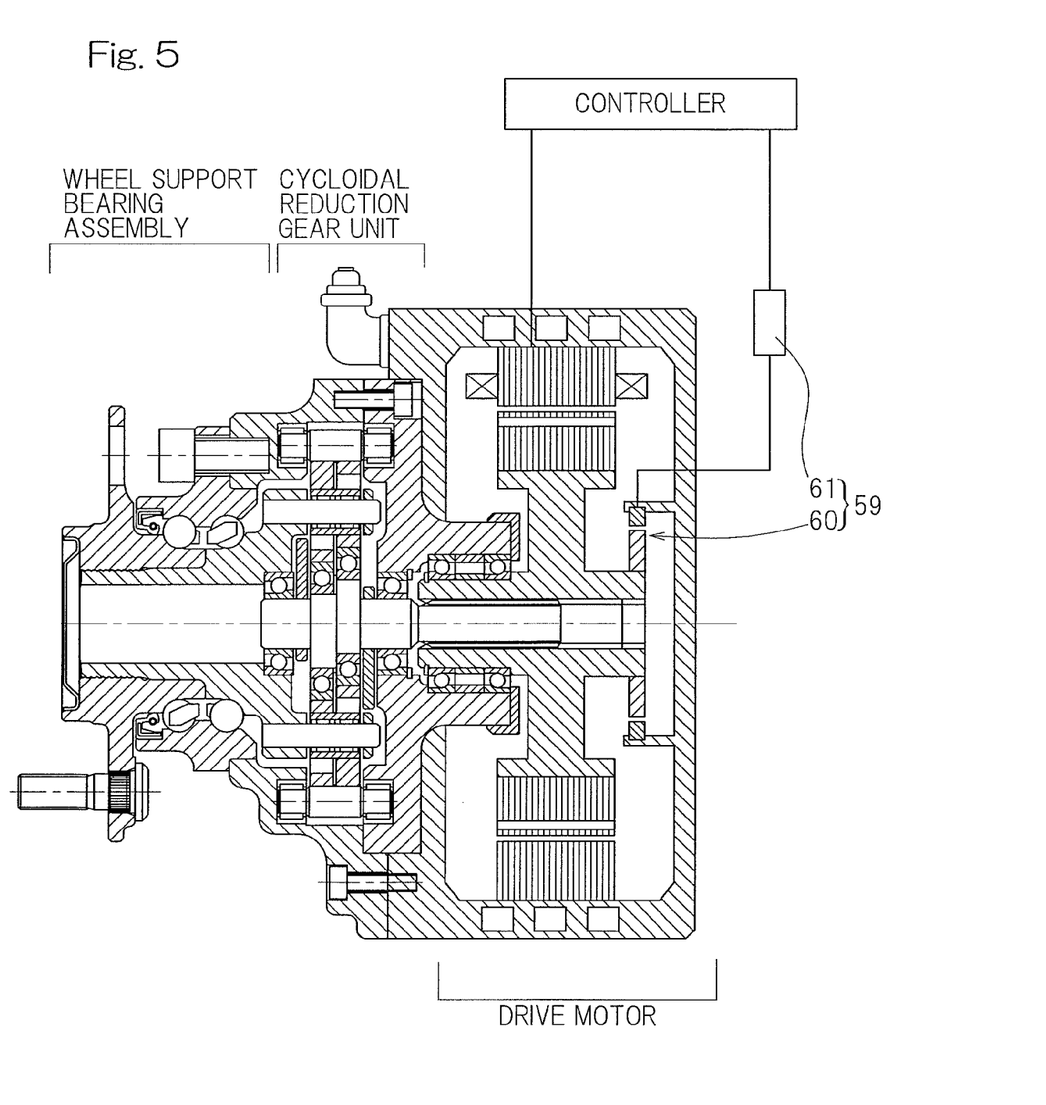
FIG. 5 is a longitudinal sectional view of a wheel support bearing assembly having built therein the drive motor that is controlled by the conventional motor driving system for the electric vehicle.

In the electrically powered automotive vehicle, or the electric vehicle for short, of the type utilizing a drive motor as a drive source for driving the automotive vehicle (such as disclosed in, for example, the patent document 1 listed below), failure of the drive motor and the failure of a controller used to control such drive motor are fatal in terms of the reliability. In driving the drive motor used in the electric vehicle, the timing at which the electric current is supplied to a coil wound around a stator of the drive motor, is controlled in dependence on the relative rotational angle between the stator and a rotor so that the efficiency thereof can be maximized. FIG. 5 of the accompanying drawing illustrates a schematic structure of the conventional motor drive system used in the electric vehicle of the type in which an in-wheel motor is built in a wheel support bearing assembly. In the case of the conventional motor drive system, in order to detect the relative rotational angle referred to above, an angle sensor 59 is provided in a portion of the drive motor.

In the case described above, for the angle sensor 59, a resolver or the like capable of accomplishing a high resolving angle sensing is used. More specifically, as the angle sensor for detecting the relative rotational angle, various structures have hitherto been suggested, including the structure in which a plurality of resolvers are incorporated and a plurality of output terminals are provided (such as disclosed in, for example, the patent document 2 listed below); the structure in which a plurality of detecting units (finite angle stators) comprising a resolver for the same rotor are arranged (such as disclosed in, for example, the patent document 3 listed below); and the structure in which a magnetic encoder and a magnetic sensor are utilized (such as disclosed in, for example, the patent document 4 listed below). Also, for those angle sensors, it may often occur that, as shown in FIG. 5, an angle calculating circuit 61 is provided outside a sensor body 60 for calculating the angle from an output signal of a sensor body 60.

[Patent Document 1] JP Laid-open Patent Publication No. 2008-168790

[Patent Document 2] JP Laid-open Patent Publication No. 2006-250864

[Patent Document 3] JP Laid-open Patent Publication No. 2008-309618

[Patent Document 4] JP Laid-open Patent Publication No. 2008-233069

SUMMARY OF THE INVENTION

With the electric vehicle, since the driving torque of the drive motor is so high as to accompany generation of electromagnetic noises from the drive motor itself, the possible influence of the electromagnetic noises on the angle sensor used in proximity to the drive motor cannot be negligible. Also, during the travel of the electric vehicle, the possibility of being affected by electromagnetic noises and electrostatic noises from the outside is high. In addition, since the controller for the drive motor is mounted on a vehicle body, it is used at all times under severe environments that are oscillated.

As discussed above, since the angle sensor used for the driving control of the drive motor in the electric vehicle is exposed to the severe environment, it may occur that in the event that the sensor body of the angle sensor and the angle calculating circuit referred to above are affected by the electromagnetic noises and/or the electrostatic noises, not only does the controller itself of the drive motor fail to operate normally, but also the drive motor is no longer driven. Also, in the event that the position, at which the sensor body of the angle sensor is fixed, is displaced from the position it ought to have been, the timing, at which the electric current is applied to the coil wound around the stator of the drive motor, is no longer controlled accurately and, therefore, there is a possibility that the driving efficiency of the drive motor tends to worsen. Particularly where the output of the drive motor forming the drive source for the electric vehicle is transmitted with torque to a vehicle tire through a reduction gear unit having a high reduction gear ratio as shown in FIG. 5, the torque change of the drive motor resulting from an instability of the angle sensor will be amplified and then transmitted to the vehicle tire and, hence, the reliability of the angle sensor is important.

An object of the present invention is to provide a motor driving system for an electrically powered automotive vehicle, in which the drive motor is rotationally controlled to increase the reliability.

The motor drive system for the electric vehicle designed in accordance with the present invention is a motor drive system for an electrically powered automotive vehicle, which includes an angle sensor for detecting a relative rotational angle between a stator and a rotor of a drive motor for driving the automotive vehicle and a controller for controlling the rotation of the drive motor on the basis of the relative rotational angle detected by the angle sensor, in which the angle sensor is provided in a plural number and the controller includes an angle sensor switching unit operable to select and activate one of the plurality of the angle sensors and then to switch over to an activation of another one of the angle sensors in the event that the one of the angle sensors is determined abnormal. It is to be noted that the wording "(to) select and activate" used hereinabove and hereinafter is intended to means that the output of the selected angle sensor is used to rotationally control the drive motor.

According to the foregoing construction, at a normal state, the angle sensor switching unit of the controller for performing the rotational control of the drive motor selects and activates one of the plurality of the angle sensors. The angle sensor switching unit, when the angle sensor under activation is determined abnormal, switches over to another one of the angle sensors. For this reason, even when the angle sensor under activation becomes abnormal because of influences brought about by electromagnetic noises and/or electrostatic noises, the rotational control of the drive motor is carried out on the basis of the relative rotational angle detected always by the normal angle sensor and, therefore, the reliability of the motor drive system can be increased.

The angle sensor switching unit determines an abnormality of the angle sensor in accordance with a prescribed rule. The contents of the prescribed rule referred to above is not specifically limited and may be any rule arbitrarily prescribed. By way of example, the angle sensor switching unit may include a sensor abnormality determining subunit for comparing respective outputs of the plurality of the angle sensors and then determining an abnormality of the angle sensors in accordance with a prescribed rule. With the respective outputs of the plurality of the angle sensors compared, the presence or absence of an abnormality in the angle sensors can be easily detected.

In the present invention, the angle sensor may include an angle sensor body for detecting and outputting a signal indicative of the relative rotational angle between the stator and the rotor and an angle calculating circuit for calculating the angle from a signal outputted by the angle sensor body, in which case the sensor abnormality determining subunit determines the abnormality of the angle sensors in the event that either one of the angle sensor body and the angle calculating circuit is detected as abnormal. In the case of the above described construction, the abnormality of the angle sensor can be further accurately determined.

In the present invention, the angle sensor switching unit may be operable to switch over to a sensorless drive mode, in the event that all of the angle sensors are determined abnormal, in which case the controller estimates the relative rotational angle between the stator and the rotor of the drive motor from an inverter voltage output applied to the stator of the drive motor and an electric current flowing across a coil of the stator and then control the rotation of the drive motor on the basis of the relative rotational angle so estimated. In the case of this construction, even when all of the angle sensors become abnormal, the drive motor can be rotationally controlled and the reliability can be increased.

In the present invention, the plurality of the angle sensors may be of the same kind Alternatively, the plurality of the angle sensors are of different kinds It is to be noted that the wording "same kind" referred to above and hereinafter and used in connection with the angle sensors employed in the practice of the present invention is intended to mean the same type in respect of whether the angle sensors are a magnetic sensor or whether they are an optical sensor; as far as the magnetic sensors are concerned, the same type in respect of whether the to-be-detected member is a magnetized magnetic encoder or whether the to-be-detected member is an encoder having a plurality of indentations or holes in a circumferential direction; the same type in respect of whether the magnetic encoder has a plurality of magnetic pole pairs arranged in a circumferential direction or whether it has magnetic poles that change on an analog basis in the circumferential direction; the same type in respect of whether a sensor element for detecting the to-be-detected member is a semiconductor or whether it is a coil; and the same type in respect of whether they are radial type or whether they are axial type; and the same type in respect of the shape and the size. On the other hand, if they are different in respect of any of those types, the angle sensors are referred to as being of the different kinds.

Where the plurality of the angle sensors of the same kind, each of the plurality of those angle sensors may include an angle sensor body for detecting and outputting the signal indicative of the relative rotational angle between the stator and the rotor and an angle calculating circuit for calculating the angle from the signal outputted from the angle sensor body, in which case the plurality of the angle sensor bodies include one magnetic encoder, which is provided in a rotatable member of the drive motor and shared by all of the angle sensor bodies, and a plurality of magnetic sensors provided on a stationary member of the drive motor for detecting magnetic field signals of the magnetic encoder. Thus, since one magnetic encoder is shared by the plurality of the angle sensor bodies taken as a sensor target, the plurality of the angle sensor bodies can be easily constructed and the cost can be reduced.

Also, where the plurality of the angle sensors are of different kinds, at least one of the plurality of the angle sensors may be an angle sensor utilizing a magnetic encoder. Where the types of the plurality of the angle sensors are different from each other, factors of generation of an abnormality differ from each other and it is not often that the plurality of the angle sensors may become abnormal all at once.

In the present invention, the output of the drive motor may be transmitted to a vehicle wheel through a reduction gear unit. Also, in such case, the reduction gear unit referred to above may be a cycloidal gear unit. If the rotary output torque of the drive motor is transmitted to the drive wheel through such a reduction gear unit having a high reduction gear ratio as the cycloidal reduction gear unit, change in torque of the drive motor is, after having been amplified, transmitted to the drive wheel, but since even in this case the rotation control of the drive motor is achieved by the motor drive system of the kind discussed above normally with a high reliability, it is possible to assuredly avoid the situation in which the torque change occurs in the drive wheel.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
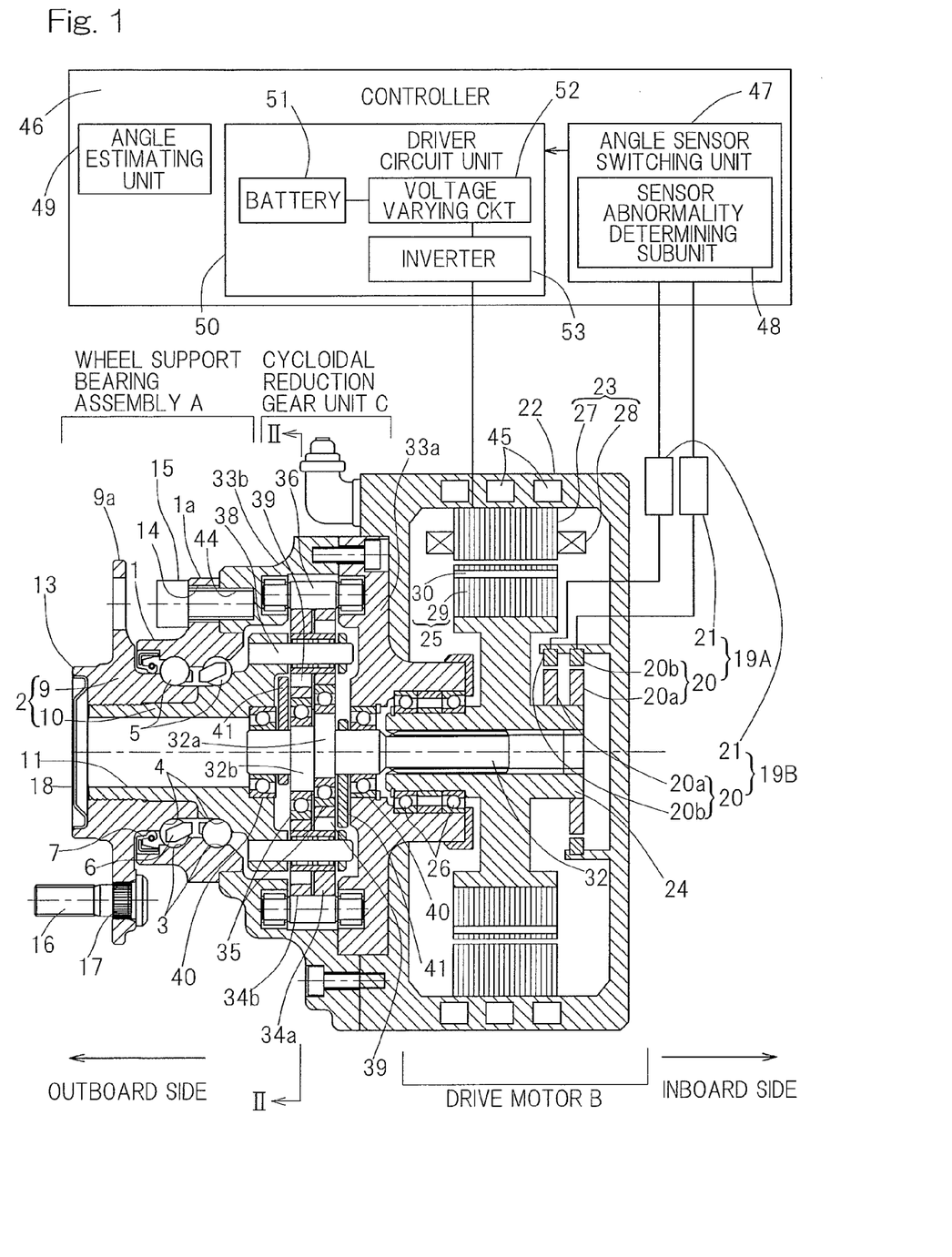
FIG. 1 is a longitudinal sectional view of a wheel support bearing assembly having built therein a drive motor that is controlled by a motor driving system for an electric vehicle designed in accordance with a first preferred embodiment of the present invention.
Figure 2:
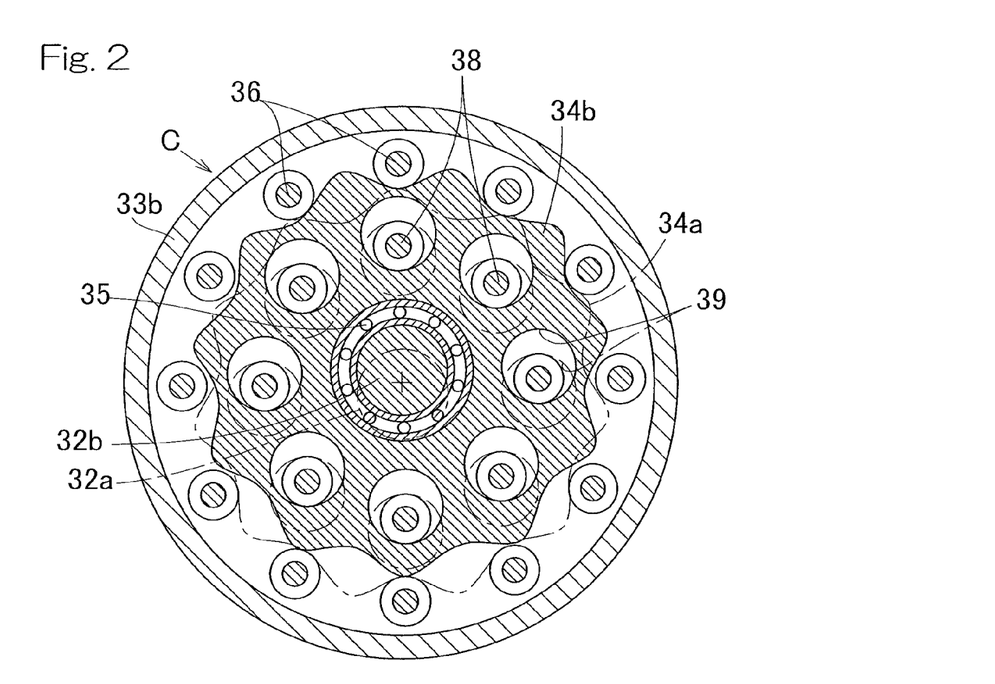
FIG. 2 is a cross sectional view taken along the line II-II in FIG. 1, showing a reduction gear unit.
Figure 3:
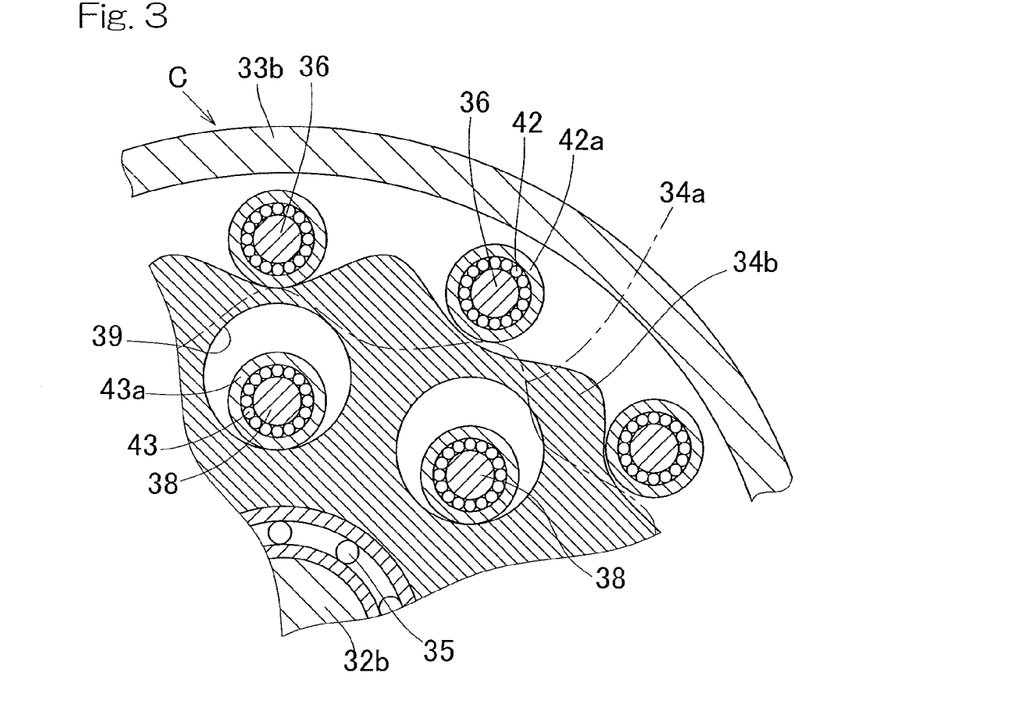
FIG. 3 is a cross sectional view of the reduction gear unit in FIG. 2, showing a portion thereof on an enlarged scale.

FIGS. 1 to 3 illustrate a first preferred embodiment of the present invention. In particular, FIG. 1 illustrates a longitudinal sectional view of a wheel support bearing assembly having built therein a drive motor that is controlled by a motor driving system for an electric vehicle designed in accordance with this embodiment of the present invention. This wheel support bearing assembly is an in-wheel motor incorporated wheel support bearing assembly of a type, in which a reduction gear unit C is interposed between a wheel support bearing unit A of an electric vehicle and a drive motor B forming a drive source for the electric vehicle and a hub of a drive wheel, supported by the wheel support bearing unit A, and a rotary output shaft 24 of the drive motor B are coaxially connected with each other. The reduction gear unit C is a cycloidal gear unit of a structure, in which a rotary input shaft 32 coaxially connected with the rotary output shaft 24 of the drive motor B is formed with eccentric portions 32a and 32b and curved plates 34a and 34b are mounted on the respective eccentric portions 32a and 32b through corresponding bearing units 35 so that respective eccentric motions of the curved plates 34a and 34b can be transmitted as a rotational motion to the wheel support bearing unit A. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel support bearing unit A includes an outer member 1 having an inner periphery formed with a plurality of rows of rolling surfaces 3, an inner member 2 having an outer periphery formed with rolling surfaces 4 defined therein in face to face relation with the respective rolling surfaces 3, and a plurality of rows of rolling elements 5 interposed between the rolling surfaces 3 of the outer member 1 and the rolling surfaces 4 of the inner member 2. The inner member 2 concurrently serves as a hub to which the drive wheel is fitted. This wheel support bearing unit A is a double row angular contact ball bearing, in which the rolling elements are in the form of balls that are retained by a ball retainer 6 employed for each row. The rolling surfaces 3, 4 are of an arcuate sectioned shape and are so formed as to have respective contact angles held in back to back relation with each other. An annular bearing space delimited between the outer member 1 and the inner member 2 have outboard and inboard annular open ends, the outboard annular open end being sealed by a sealing member 7.

The outer member 1 constitutes a stationary raceway ring and is of one piece construction having a flange 1a to be fitted to a housing 33b on the outboard side of the reduction gear unit C. This flange 1a has bolt insertion holes 14 defined at a plurality of circumferential locations thereof, respectively. The housing 33b is provided with bolt threading holes 44, each having an inner periphery helically threaded, at locations alignable with the respective bolt insertion holes 14. When mounting bolts 15 inserted through the respective bolt insertion holes 14 are threadingly engaged in the bolt threading holes 44, the outer member 1 is fitted to the housing 33b.

The inner member 2 constitutes a rotatable raceway ring and is made up of an outboard member 9, having a hub flange 9a for the support of the vehicle wheel, and an inboard member 10 having an outboard side, mounted on an inner periphery of the outboard member 9, and integrated together with the outboard member 9 by means of crimping. The rolling surfaces 4 of each row are formed in the outboard member 9 and the inboard member 10, respectively. The inboard member 10 has its center formed with a center bore 11. The hub flange 9a is provided with press fitting holes 17 at a plurality of circumferential locations, respectively, for receiving therein corresponding hub bolts 16. A cylindrical pilot portion 13 for guiding the automotive drive wheel and a brake component (both not shown) is defined in the vicinity of a root portion of the hub flange 9a in the outboard member 9 so as to protrude towards the outboard side. This pilot portion 13 has an inner periphery, to which a cap 18 is fitted, for closing an outboard opening of the center bore 11.

The reduction gear unit C is a cycloidal gear unit as hereinabove described, and the two curved plates 34a and 34b, each being of a contour depicted by the smoothly corrugated trochoidal curve as shown in FIG. 2, are mounted on the respective eccentric portions 32a and 32b of the rotary input shaft 32 through the respective bearing units 35. A plurality of outer pins 36 for guiding the respective eccentric motions of the curved plates 34a and 34b on an outer peripheral side are bridged between the housings 33a and 33b, and a plurality of inner pins 38 fitted to the inboard member 10 of the inner member 2 are engaged in a corresponding number of round sectioned throughholes 39 defined inside each of the curved plates 34a and 34b. The rotary input shaft 32 is splined to the rotary output shaft 24 of the drive motor B and is therefore rotatable together therewith. The rotary input shaft 32 referred to above is rotatably supported by an inner diametric surface of the housing 33a on the inboard side and an inner diametric surface of the inboard member 10 of the inner member 2 through two, axially spaced bearing units 40.

As the rotary output shaft 24 of the drive motor B rotates, the curved plates 34a and 34b mounted on the rotary input shaft 32 that is integrally rotatable together therewith undergo respective eccentric motions. These eccentric motions of the curved plates 34a and 34b are transmitted as a rotational motion to the inner member 2 through the engagement between the inner pins 38 and the respective throughholes 39. The rotation of the inner member 2 becomes reduced in speed relative to the rotation of the rotary output shaft 24. By way of example, the one state cycloidal gear device is effective to provide the reduction gear ratio of 10 or higher.

The two curved plates 34a and 34b are mounted on the eccentric portions 32a and 32b of the rotary input shaft 32, respectively, while having been displaced 180° in phase from each other. In order to counterbalance those eccentric motions of the eccentric portions 32a and 32b with each other, a counterweights 41 are mounted on both sides of each of the eccentric portions 32a and 32b and is displaced in a direction counter to the direction of eccentricity of the associated eccentric portion 32a and 32b so that vibrations induced by the eccentric motion of each of the curved plates 34a and 34b can be counteracted.

As shown in FIG. 3 on an enlarged scale, the outer pins 36 and the inner pins 38 have respective bearing units 42 and bearing units 43 mounted thereon, and those bearing units 42 and 43 include respective outer rings 42a and 43a that are held in rolling contact with the outer peripheries of the curved plates 34a and 34b and inner peripheries of the throughholes 39, respectively. Accordingly, the respective eccentric motions of the curved plates 34a and 34b can be smoothly transmitted as the rotational motion to the inner member 2 while the resistance of contact between the outer pins 36 and the outer peripheries of the curved plates 34a and 34b and the resistance of contact between the inner pins 38 and the inner peripheries of the throughholes 39 are reduced.

The drive motor B is an IPM motor of a radial gap type, in which a radial gap is provided between a motor stator 23, fixed to the cylindrical motor housing 22, and a motor rotor 25 fitted to the rotary output shaft 24. The rotary output shaft 24 is supported in a cantilever fashion by a cylindrical portion of the housing 33a on the inboard side of the reduction gear unit C through two, axially spaced bearing units 26, 26. Also, a peripheral wall portion of the motor housing 22 is provided with a cooling liquid passage 45. With a lubricant oil or a water soluble coolant supplied through this cooling liquid passage 45, the motor stator 23 can be cooled thereby.

The motor stator 23 includes a stator core portion 27, made of a soft magnetic material, and a coil 28. The stator core portion 27 has an outer peripheral surface thereof fitted to an inner peripheral surface of the motor housing 22 and is retained in position by the motor housing 22. The motor rotor 25 referred to above is made up of a rotor core portion 29, mounted externally on the rotary output shaft in coaxial relation with the motor stator 23, and a plurality of permanent magnets 30 incorporated in the rotor core portion 29.

The drive motor B is provided with a plurality of, for example, two in the instance now under discussion, angle sensors 19A and 19B for detecting the relative rotational angle between the motor stator 23 and the motor rotor 25. Each of the angle sensors 19A and 19B is made up of an angle sensor body 20 for detecting and outputting a signal indicative of the relative rotational angle between the motor stator 23 and the motor rotor 25, and an angle calculating circuit 21 for calculating the angle from the signal outputted from the angle sensor body 20. The angle sensor body 20 is in turn made up of a to-be-detected member 20a provided on the outer peripheral surface of the rotary output shaft 24, and a detecting member 20b provided in the motor housing 22 and disposed, for example, radially proximate to and in face to face relation with the to-be-detected member 20a. Alternatively, the to-be-detected member 20a and the detecting member 20b may be disposed axially proximate to and in face to face relation with each other. In the instance now under discussion, for the angle sensors 19A and 19B, sensors of different kinds are employed.

In other words, as one 19A of the angle sensors, the angle sensor of a type, in which the to-be-detected member 20a of the angle sensor body 20 of such angle sensor is comprised of, for example, a magnetic encoder, is employed. For the other 19B of the angle sensors, a resolver is employed. The rotational control of the drive motor B is carried out by means of a controller 46. In this drive motor B, in order to maximize the efficiency thereof, based on the relative rotational angle between the motor stator 23 and the motor rotor 25 detected by the angle sensors 19A and 19B, the timing of application of each phase of waveforms of an alternating current to be supplied across the coil 28 of the motor stator 23 is controlled by the controller 46.

The controller 46 includes an angle sensor switching unit 47 for selectively activating one of the plurality of the angle sensors 19A and 19B and then switching the operation of such selected angle sensor 19A or 19B over to the operation of the other of the angle sensor 19B or 19A in the event that such selected angle sensor 19A or 19B is determined as abnormal. This angle sensor switching unit 47 in turn includes a sensor abnormality determining subunit 48 for comparing respective outputs of the plurality of the angle sensors 19A and 19B and then determining the abnormality of the above described angle sensor in accordance with a prescribed rule. More specifically, the sensor abnormality determining subunit 48 is operable to determine the abnormality of such angle sensor in the event that the abnormality of one of the angle sensor body 20, forming each of the angle sensors 19A and 19B, and the angle calculating circuit 21 is detected. The prescribed rule referred to above may be an arbitrary rule and may determine the abnormality in the event that the amount of displacement of, for example, the phase, the wavelength and/or the amplitude between the respective outputs of the plurality of the angle sensors is equal to or higher than a predetermined value.

Also, the angle sensor switching unit 47 has a function of switching a drive mode of the controller 46 over to a sensorless drive mode, in which no detection result of the angle sensors 19A and 19B is utilized, in the event that the sensor abnormality determining subunit 48 determines that all of the plurality of the angle sensors 19A and 19B are abnormal. The controller 46 additionally includes an angle estimating unit 49 and a driver circuit subunit 50 and, during the sensorless drive mode, the angle estimating unit 49 estimates the relative rotational angle between the motor stator 23 and the motor rotor 25 from an inverter voltage output, applied to the coil 28 of the motor stator 23, and the electric coil current flowing across the coil 28, and performs a rotational control of the drive motor B on the basis of the relative rotational angle so estimated. In the driver circuit subunit 50, a motor drive voltage is acquired by variably controlling the voltage of a battery 51 by means of a voltage varying circuit 52 and this motor drive voltage is applied to the coil 28 of the motor stator 23 through an inverter 53.

As hereinabove described, the motor drive system for the electric vehicle as hereinabove described is so designed and so configured that the use is made of the plurality of the angle sensors 19A and 19B for detecting the relative rotational angle between the motor stator 23 and the motor rotor 25 and, in the controller 46 for performing the rotational control of the drive motor B on the basis of the relative rotational angle referred to above, one of the plurality of the angle sensors 19A and 19B is selected and activated and, in the event that the sensor abnormality determining unit 48 determines that the angle sensor being activated is abnormal, the angle sensor switching unit 47 switches it over to the other angle sensor. For this reason, even the angle sensor under activation becomes abnormal because of influences caused by the electromagnetic noises and/or the electrostatic noises, the rotational control of the drive motor B is carried out at all times on the basis of the relative rotational angle detected by the normal angle sensor and, therefore, the reliability can increase. Also, since on the basis of the relative rotational angle between the motor stator 23 and the motor rotor 25 the timing of application of the electric current across the coil 28 of the motor stator is controlled, the driving efficiency of the drive motor B can be maximized.

Since in the foregoing embodiment of the present invention, the sensor abnormality determining subunit 48 of the angle sensor switching unit 47 has been shown and described as operable to compare the respective outputs of the plurality of the angle sensors 19A and 19B and then to determine the abnormality of the angle sensor under activation in accordance with the prescribed rule, the presence or absence of abnormality can be easily monitored.

Also, since in the foregoing embodiment of the present invention, in determining the abnormality of the angle sensors by means of the sensor abnormality determining subunit 48, the angle sensor is determined as abnormal when an abnormality of either one of the angle sensor body 20, forming a part of the associated angle sensor 19A or 19B, and the angle calculating circuit 21, the abnormality of the angle sensors can be further accurately determined.

Furthermore, since in the foregoing embodiment of the present invention, the angle sensor switching unit 47 of the controller 46 switches over to the sensorless drive mode, in the event that the sensor abnormality determining subunit 48 determines the presence of the abnormality in all of the angle sensors 19A and 19B, and the angle estimating unit 49 of the controller 46 estimates the relative rotational angle between the motor stator 23 and the motor rotor 25 from the inverter voltage output applied to the coil 28 of the motor stator 23 and the electric current flowing across the coil, and the controller 46 then performs the rotational control of the drive motor B on the basis of the relative rotational angle so estimated, the drive motor B can be rotationally controlled, even when all of the angle sensors 19A and 19B become abnormal, and, therefore, the reliability of the motor drive system can be increased.

Yet, in the foregoing embodiment of the present invention, since the rotational output of the drive motor B is applied in the electric vehicle of a kind, in which the torque is transmitted to the drive wheel through the cycloidal gear reduction unit having a high reduction gear ratio, the change in torque of the drive motor B is, after having been amplified, transmitted to the drive wheel, but since the rotational control of the drive motor B is normally carried out by the above described motor drive system with a high reliability, it is possible to assuredly avoid any situation that results in the torque variation in the drive wheel.

Figure 4:
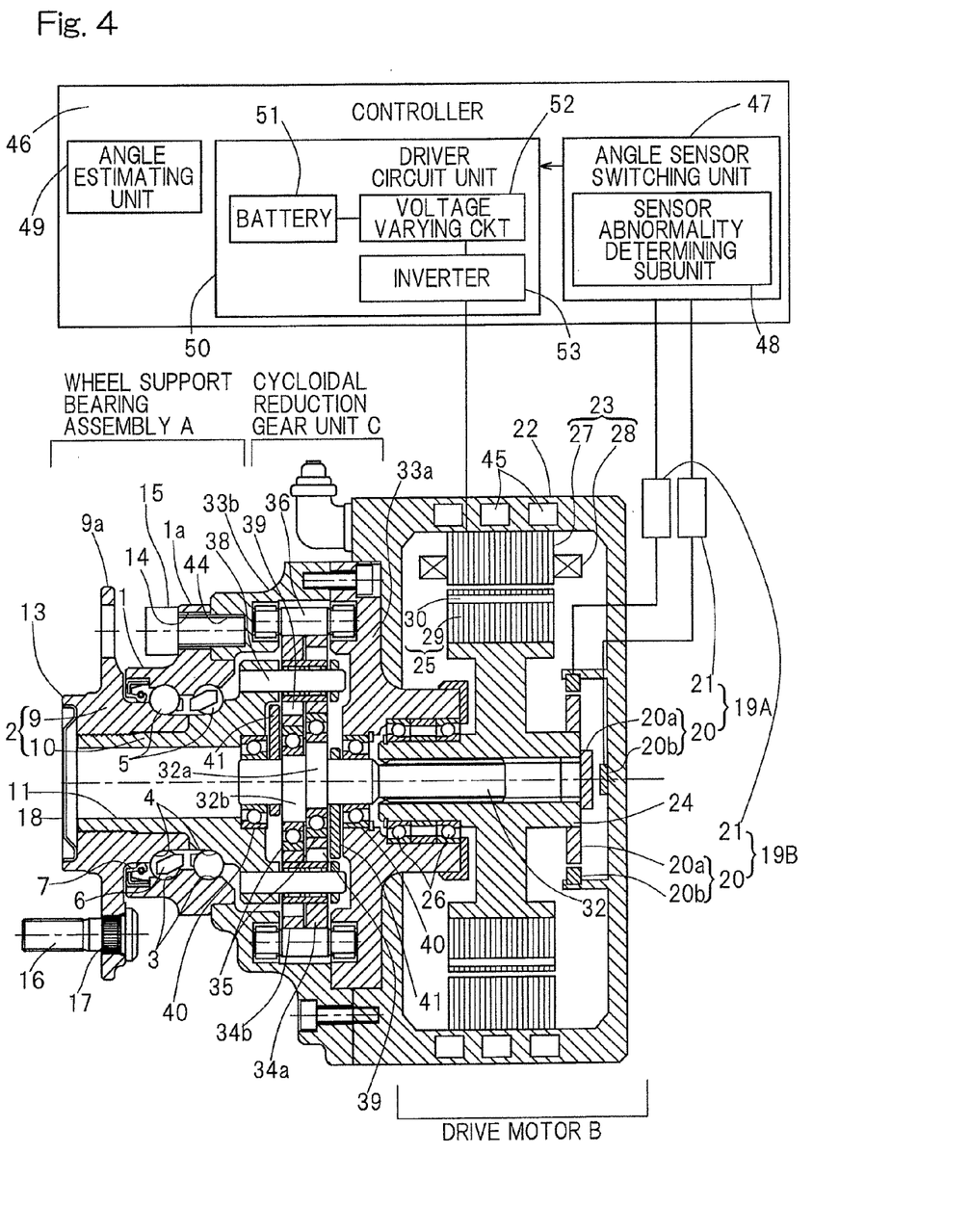
FIG. 4 is a longitudinal sectional view of a wheel support bearing assembly having built therein the drive motor that is controlled by the motor driving system for the electric vehicle designed in accordance with a second preferred embodiment of the present invention.

FIG. 4 illustrates a second preferred embodiment of the present invention. In this motor drive system, in the previous embodiment shown in and described with particular reference to FIG. 1, of the two angle sensors 19A and 19B, the angle sensor body 20 of the angle sensor 19A is an axial type, in which the to-be-detected member 20a thereof and the detecting member 20b thereof are disposed proximate to and in face to face relation with each other in an axial direction. More specifically, the to-be-detected member 20a is provided on an end face of the rotary output shaft 24 and the detecting member 20b is provided at a position axially confronting the rotary output shaft 24 on an inner surface of the motor housing 22. Other structural features and functions and effects are similar to those afforded by the previously described first embodiment of the present invention shown in FIGS. 1 to 3.

It is to be noted that although in describing each of the foregoing embodiments of the present invention, the plurality of the angle sensors 19A and 19B have been described as of the types different from each other, they may be of the same type. Also, particularly where the respective angle sensor bodies 20 of the angle sensors 19A and 19B in such case make use of a magnetic encoder as the to-be-detected member 20a thereof and a magnetic sensor for detecting a magnetic field signal of the magnetic encoder as the detecting member 20b, the plurality of the angle sensor bodies 20 may be constructed by the utilization of one magnetic encoder as the to-be-detected members 20a, shared by all of the angle sensor bodies 20, and separate magnetic sensors, each corresponding to the angle sensor body 20, as the detecting members 20b. In this case, the plurality of the angle sensor bodies 20 can be easily configured and the cost can be reduced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 19A, 19B . . . Angle sensor
20 . . . Angle sensor body
21 . . . Angle calculating circuit
23 . . . Motor stator
25 . . . Motor rotor
28 . . . Coil
46 . . . Controller
47 . . . Angle sensor switching unit
48 . . . Sensor abnormality determining subunit
49 . . . Angle estimating unit
A . . . Wheel support bearing unit
B . . . Drive motor
C . . . Reduction gear unit

What is claimed is:

1. A motor drive system for a wheel of an electrically powered automotive vehicle, which system comprises:
a plurality of angle sensors, each of the angle sensors being configured to detect a relative rotational angle between a stator and a rotor of a drive motor for driving the automotive vehicle; and
a controller for controlling the rotation of the drive motor on the basis of the relative rotational angle detected by one of the angle sensors, the controller including a driver circuit subunit which is provided with an inverter and a voltage varying circuit, the inverter applying an inverter voltage output to a coil of the stator of the drive motor, the voltage varying circuit variably controlling a voltage of a battery to be supplied to the inverter;
wherein the controller comprises an angle sensor switching unit operable to select and activate one of the plurality of the angle sensors and then to switch over to an activation of another one of the angle sensors in the event that the one of the angle sensors is determined abnormal, and
wherein the angle sensor switching unit is operable to switch over to a sensorless drive mode, in the event that all of the angle sensors are determined abnormal, and the controller estimates the relative rotational angle between the stator and the rotor of the drive motor from an inverter voltage output applied to the stator of the drive motor and an electric current flowing across a coil of the stator and then controls the rotation of the drive motor on the basis of the relative rotational angle so estimated.

2. The motor drive system for a wheel of the electrically powered automotive vehicle as claimed in claim 1, wherein the angle sensor switching unit comprises a sensor abnormality determining subunit for comparing respective outputs of the plurality of the angle sensors and then determining an abnormality of the angle sensors in accordance with a prescribed rule.

3. The motor drive system for a wheel of the electrically powered automotive vehicle as claimed in claim 2, wherein each of the angle sensors comprises an angle sensor body for detecting and outputting a signal indicative of the relative rotational angle between the stator and the rotor and an angle calculating circuit for calculating the angle from a signal outputted by the angle sensor body, and wherein the sensor abnormality determining subunit determines the abnormality of the angle sensor in the event that either one of the angle sensor body of the angle sensor and the angle calculating circuit of the angle sensor is detected as abnormal.

4. The motor drive system for a wheel of the electrically powered automotive vehicle as claimed in claim 1, wherein the plurality of the angle sensors are of the same kind.

5. The motor drive system for a wheel of the electrically powered automotive vehicle as claimed in claim 4, wherein each of the plurality of the angle sensors comprises an angle sensor body for detecting and outputting the signal indicative of the relative rotational angle between the stator and the rotor and an angle calculating circuit for calculating the angle from the signal outputted from the angle sensor body, the plurality of the angle sensor bodies including one magnetic encoder, which is provided in a rotatable member of the drive motor and shared by all of the angle sensor bodies, and a plurality of magnetic sensors provided on a stationary member of the drive motor for detecting magnetic fields signal of the magnetic encoder.

6. The motor drive system for a wheel of the electrically powered automotive vehicle as claimed in claim 1, wherein the plurality of the angle sensors are of different kinds.

7. The motor drive system for a wheel of the electrically powered automotive vehicle as claimed in claim 6, wherein at least one of the plurality of the angle sensors is an angle sensor utilizing a magnetic encoder.

8. The motor drive system for a wheel of the electrically powered automotive vehicle as claimed in claim 1, wherein the output of the drive motor is transmitted to a vehicle wheel through a reduction gear unit.

9. The motor drive system for a wheel of the electrically powered automotive vehicle as claimed in claim 8, wherein the reduction gear unit is a cycloidal reduction gear unit.

\* \* \* \* \*